(12) United States Patent
Sarkar et al.

(10) Patent No.: US 10,245,581 B2
(45) Date of Patent: Apr. 2, 2019

(54) COMPOSITION AND PROCESS FOR PREPARATION OF ATTRITION RESISTANT ADDITIVE SUITABLE FOR CRACKING HYDROCARBON FEED

(71) Applicant: INDIAN OIL CORPORATION LIMITED, Mumbai (IN)

(72) Inventors: Biswanath Sarkar, Haryana (IN); Arumugam Velayutham Karthikeyani, Haryana (IN); Mohan Prabhu Kuvettu, Haryana (IN); Mahesh Kadgaonkar, Haryana (IN); Velusamy Chidambaram, Haryana (IN); Balaiah Swamy, Haryana (IN); Brijesh Kumar, Haryana (IN); Biswapriya Das, Haryana (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 146 days.

(21) Appl. No.: 15/233,485

(22) Filed: Aug. 10, 2016

(65) Prior Publication Data
US 2017/0151554 A1    Jun. 1, 2017

(30) Foreign Application Priority Data
Nov. 30, 2015   (IN) .......................... 4494/MUM/2015

(51) Int. Cl.
| | |
|---|---|
| B01J 29/06 | (2006.01) |
| B01J 29/40 | (2006.01) |
| B01J 37/00 | (2006.01) |
| C10G 11/05 | (2006.01) |
| B01J 35/00 | (2006.01) |
| B01J 37/28 | (2006.01) |
| B01J 27/16 | (2006.01) |
| B01J 35/10 | (2006.01) |
| B01J 37/04 | (2006.01) |

(52) U.S. Cl.
CPC ............... *B01J 29/40* (2013.01); *B01J 27/16* (2013.01); *B01J 35/002* (2013.01); *B01J 37/0009* (2013.01); *B01J 37/0045* (2013.01); *B01J 37/28* (2013.01); *C10G 11/05* (2013.01); *B01J 35/0033* (2013.01); *B01J 35/1014* (2013.01); *B01J 35/1019* (2013.01); *B01J 37/04* (2013.01); *B01J 2229/20* (2013.01); *B01J 2229/42* (2013.01); *C10G 2300/70* (2013.01); *C10G 2400/02* (2013.01)

(58) Field of Classification Search
CPC .... B01J 29/40; B01J 35/1014; B01J 35/1019; B01J 35/002; B01J 35/0033; B01J 37/0045; B01J 37/0009; B01J 2229/20; B01J 2229/42; C01B 25/36
USPC ...... 502/60, 63, 64, 68, 69, 71, 77; 423/605, 423/306, 309, 310
See application file for complete search history.

(56) References Cited

U.S. PATENT DOCUMENTS

| | | |
|---|---|---|
| 3,847,793 A | 11/1974 | Schwartz et al. |
| 4,309,280 A | 1/1982 | Rosinski et al. |
| 4,784,745 A * | 11/1988 | Nace ..................... C10G 55/06 208/100 |
| 4,867,863 A | 9/1989 | Herbst et al. |
| 5,039,640 A | 8/1991 | Absil et al. |
| 5,055,437 A | 10/1991 | Herbst et al. |
| 5,190,902 A | 3/1993 | Demmel |
| 5,286,369 A | 2/1994 | Roberie et al. |
| 5,348,643 A | 9/1994 | Absil et al. |
| 5,364,875 A * | 11/1994 | Wilde ................. C07D 403/12 514/338 |
| 5,707,442 A | 1/1998 | Fogel et al. |
| 5,846,402 A | 12/1998 | Mandal et al. |
| 5,997,728 A | 12/1999 | Adewuyi et al. |
| 6,080,303 A | 6/2000 | Cao et al. |
| 6,137,022 A | 10/2000 | Kuechler et al. |
| 6,258,257 B1 | 7/2001 | Swan, III et al. |
| 6,613,710 B2 | 9/2003 | Ray et al. |
| 6,677,263 B2 | 1/2004 | Wang et al. |
| 7,517,827 B2 | 4/2009 | Ravichandran et al. |
| 8,540,955 B2 * | 9/2013 | Khandke ................ A61K 33/06 423/304 |

FOREIGN PATENT DOCUMENTS

| | | |
|---|---|---|
| CA | 2156607 | 9/1998 |
| EP | 0167325 A2 | 1/1986 |

* cited by examiner

*Primary Examiner* — Elizabeth D Wood
(74) *Attorney, Agent, or Firm* — Maschoff Brennan

(57) ABSTRACT

The present invention relates to attrition resistant hydrocarbon cracking catalyst additive composition comprising aluminum phosphate binder for cracking of hydrocarbon molecules to produce light olefins and process of preparation thereof. The present invention further relates to the process of preparation of the aluminum phosphate binder wherein said binder is incorporated into the ZSM-5 additive composition to enhance its attrition resistance property as well as enhance selectivity and activity of additive composition for production of light olefins such as liquefied petroleum gas (LPG).

5 Claims, No Drawings

COMPOSITION AND PROCESS FOR PREPARATION OF ATTRITION RESISTANT ADDITIVE SUITABLE FOR CRACKING HYDROCARBON FEED

CROSS-REFERENCE TO RELATED APPLICATION

This application claims priority to Indian Patent Application No. 4494/MUM/2015 filed 30 Nov. 2015, the disclosure of which is hereby incorporated by reference in its entirety.

FIELD OF THE INVENTION

The present invention relates to attrition resistant hydrocarbon cracking catalyst additive composition for cracking of hydrocarbon molecules to produce light olefins and process of preparation thereof.

BACKGROUND

Catalytic cracking processes in which hydrocarbonaceous oil is converted to lower boiling hydrocarbon products in the presence of cracking catalysts are well known. These processes involve contamination of catalyst with carbon and high-boiling hydrocarbon. In order to remove the contaminants, the catalyst is subjected to regeneration at higher temperatures before it is returned to the cracking zone. Generally, during the process of regeneration, the zeolite component of the catalysts loses a substantial portion of its crystallinity and activity. Their catalytic activity is reduced rapidly. There had been a lot of research done in this field for improving the stability of the catalyst. There are many literature in the prior art which teaches the attrition resistant zeolite based catalysts but there has been a very less information or knowledge of aluminium phosphate binder based zeolite catalyst which are stable and cracks hydrocarbon molecules selectively to produce light olefins.

Following patents illustrate prior art processes and compositions which are different from present invention with respect to composition, process and performance.

U.S. Pat. No. 5,286,369 discloses aluminium phosphate binder for binding various zeolites, prepared by reaction between aluminium nitrate and phosphoric acid. However, the nitric acid which is by product of binder production, affects activity and selectivity of the finished catalyst product, though it possess acceptable Attrition Index.

U.S. Pat. No. 3,847,793 discloses a process for conversion of hydrocarbons with a dual cracking component catalyst comprising ZSM-5 zeolite based catalyst and large pore zeolite based catalyst.

U.S. Pat. No. 6,258,257 discloses a process for producing polypropylene from C3 olefins by a two-stage fluid catalytic cracking process having two types of catalysts made from zeolites of large pore and medium pore.

U.S. Pat. No. 6,137,022 discloses a process of making an olefin product from an oxygenated feedstock by contacting the feedstock in a reaction zone containing 15 volume percent or less of a catalyst, preferably a catalyst comprising a silica-alumina-phosphate molecular sieve.

EP0167325A relates to higher make-up of catalyst that may contain 2 or 3 times the amount of ZSM-5 sought for the equilibrium catalyst.

U.S. Pat. No. 4,309,280 describes a process for maximizing of LPG by adding very small amounts of powdered, neat ZSM-5 catalyst, characterized by a particle size below 5 microns to the FCC catalyst inventory.

U.S. Pat. No. 4,784,745 relates to a catalyst and a process for enhancing octane number of gasoline, wherein said shape-selective zeolite is selected from the group having the structure of ZSM-5, ZSM-11, ZSM-12, ZSM-23, ZSM-34, ZSM-35, ZSM-38, ZSM-48, ZSM-50, TMA Offretite and Erionite.

U.S. Pat. No. 4,867,863 deals with a Resid catalytic cracking process utilizing ZSM-5 for increased gasoline octane.

U.S. Pat. No. 5,039,640 refers to a catalyst composition comprising of large pore crystalline molecular sieve component and an MCM-22 zeolite for catalytic cracking of a hydrocarbon oil to provide a product of increased octane number and increased C5+ gasoline content.

U.S. Pat. No. 5,055,437 deals with multi-component catalyst mixture having Ga in ZSM-5 and process for catalytic cracking of heavy hydrocarbon feed to lighter products.

U.S. Pat. No. 5,190,902 and Canadian patent i.e., CA2156607A1 discloses the processes for the preparation of attrition resistant binder particles by spray drying of clay phosphate slurry and ZSM-5 zeolite with adjusted extreme pH conditions.

U.S. Pat. No. 5,348,643 relates to a process for converting feedstock hydrocarbon compounds over a catalyst composition comprising clay and a zeolite component, at least one of which has been treated with a phosphorus-containing compound, which is spray dried at a low pH, to produce high octane gasoline and increased lower olefins, especially propylene and butylene U.S. Pat. No. 5,707,442A discloses novel aluminium phosphates, in particular amorphous aluminium phosphate powders having a BET specific surface no greater than 25 $m^2/g$, well suited as binders/hardeners or for the production of ceramic shaped articles, are prepared by reacting at least one aluminium compound, e.g., an aluminium oxide, hydroxide or oxyhydroxide, with phosphoric acid or an aluminium phosphate, e.g., an acid aluminium orthophosphate, in a liquid reaction medium devoid of inorganic acid anions other than of phosphoric acid, and then spray- or freeze-drying the suspension thus obtained.

U.S. Pat. No. 5,846,402 relates to a process for selective catalytic cracking of a petroleum-based feedstock to produce a product having a high yield of liquefied petroleum gas (LPG) and light olefins having 3 to 4 carbons.

U.S. Pat. No. 5,997,728, refers to a process for cracking of heavy feed in an FCC unit, to enhance light olefins, without excessive production of aromatics, or loss of gasoline yield with large amounts of shape selective cracking additive preferably at least 10 wt % additive, of 12-40% ZSM-5 on an amorphous support, equivalent to more than 3.0 wt % ZSM-5 crystal circulating with equilibrium catalyst.

U.S. Pat. No. 6,613,710 deals with a process for preparing bi-functional catalyst comprising of molecular sieves, modified clay and semi-basic alumina for effective cracking of high boiling petroleum feedstock to provide simultaneously, enhanced yields of Liquefied Petroleum Gas (LPG) and reduction of undesirable bottoms.

U.S. Pat. No. 6,677,263 discloses a catalytic promoter comprising of 5-65 wt % of modified HZSM-5 zeolite with Zn, P, Ga, Al, Ni and rare earth elements in an amount 0.01-10.37 wt % based on total weight of HZSM-5 zeolite to increase gasoline octane number and an increased lower olefin yield.

U.S. Pat. No. 7,517,827 teaches preparation of cracking catalyst composition having high selectivity towards production light olefins such as LPG, propylene etc. achieved through treating the zeolite with sodium free basic compound with or without phosphate. Though the catalyst provides activity and selectivity towards light olefins but it lacks attrition resistance.

U.S. Pat. No. 6,080,303 teaches a process for improving the catalytic activity of small and medium pore acidic zeolite catalyst which comprises the steps of treating a zeolite with a phosphorus compound to form phosphorus treated zeolite and combining the phosphorus treated zeolite with aluminium phosphate.

Although research is being done on stability of catalyst and to enhance the attrition resistant properties of the cracking catalyst, however none of the prior arts discloses the catalyst possessing the properties such as enhanced attrition resistant properties as well as cracking of hydrocarbon molecules selectively to produce light olefins.

Hence, there has always been a demand of development of process that can address the drawbacks of the prior arts.

OBJECTIVE

The main object of the present invention is to obtain the enhance of Liquefied Petroleum Gas (LPG) by preparing an attrition resistant catalyst additive composition used for cracking of hydrocarbon molecules into light olefins.

The other object of the present invention is to prepare an attrition resistant ZSM-5 additive composition having % Attrition Index (ASTM D5757) below 5 and ABD above 0.75 g/cm$^3$. The another object of the present invention is to prepare aluminium phosphate binder having surface area 80-200 m$^2$/gm when dried, and zeta potential in the range of −40 mv to −60 mv.

The one another object of the present invention is to prepare a ZSM-5 additive using the said aluminium phosphate binder to improve its attrition resistance property as well as activity for the production of light olefins.

SUMMARY

The present invention relates to an attrition resistant hydrocarbon cracking catalyst additive composition comprising an aluminium phosphate binder, wherein said binder is having a surface area in the range of 80-200 m$^2$/gm in dry form, and zeta potential in the range of −40 mv to −60 mv.

The present invention relates to an aluminium phosphate binder having surface area in the range of 80-200 m$^2$/gm and zeta potential in the range of −40 mv to −60 mv wherein the surface area of the binder is measured after oven drying of binder solution.

The present invention further relates to an attrition resistant hydrocarbon cracking catalyst additive composition comprising of:
a) 10-70 wt % ZSM-5 zeolite;
b) 5-12 wt % aluminium phosphate binder;
c) 5-20 wt % colloidal silica;
d) 10-60 wt % clay; and
e) 1-12 wt % phosphate.

The present invention further relates to a process for preparation of an aluminium phosphate binder, wherein said process comprising of reacting aluminium compound with acidic phosphate compound and at least one basic phosphate compound.

The present invention furthermore relates to a process for preparation of an attrition resistant cracking catalyst additive composition comprising:

a) preparing an aluminium phosphate binder solution by adding aqueous solution of a basic phosphate compound to an aluminium phosphate solution, wherein said aluminium phosphate solution is prepared by reacting an aluminium compound with acidic phosphate compound in water under heating;
b) preparing phosphated zeolite slurry by adding di-ammonium hydrogen phosphate to zeolite;
c) preparing clay-silica-alumina phosphate slurry by adding kaolin clay slurry and ammonium polysilicate to aluminium phosphate binder solution of step (a);
d) preparing additive precursor slurry by adding the phosphated zeolite slurry of step (b) to the clay-silica-alumina phosphate slurry of step (c); and
e) spray-drying followed by calcinations of the additive precursor slurry of step (d) to obtain the final attrition resistance additive product ready for use to crack the hydrocarbon molecules to produce light olefins.

DESCRIPTION

In general, aluminium phosphate solution prepared as per the prior art literature contains very high concentration of free acid which is detrimental to catalyst activity. It is found, application of such aluminium phosphate as a binder though provide ABD to the catalyst, but due to presence of acid, it is found to be detrimental to catalyst and hence not suitable to be used in catalyst composition.

Also, there is very little information in the prior art related to use of aluminium phosphate binder which can simultaneously address both attrition resistance property as well as activity of catalyst for cracking of hydrocarbon molecules to produce selectively light olefin products. Although some of the prior art mention about aluminium phosphate as binder, but prepared only from aluminium nitrate and phosphoric acid (U.S. Pat. No. 5,286,369) which possesses less activity and selectivity. Also, the prior art process relates to preparation of high attrition resistant additive microsphere with inferior activity and selectivity.

Further, the catalyst which provides activity and selectivity towards light olefins, the ABD and AI (Attrition Index) resistance are found to be on the lower side. In order to ensure the catalyst retention in the process unit for a longer period, it is desirable to further increase the AI of the catalyst product.

While the invention is susceptible to various modifications and/or alternative processes and/or compositions, specific embodiment thereof has been shown by way of example in the drawings and tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The graphs, tables, formulas, protocols have been represented where appropriate by conventional representations in the drawings, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention.

Accordingly, the main embodiment of the present invention provides an attrition resistant hydrocarbon cracking catalyst additive composition comprising an aluminium phosphate binder, wherein said binder is having a surface area in the range of 80-200 m$^2$/gm in dry form, and zeta potential in the range of −40 mv to −60 mv.

In other embodiment, the said composition comprises of:
a) 10-70 wt % ZSM-5 zeolite;
b) 5-12 wt % aluminium phosphate binder;
c) 5-20 wt % colloidal silica;
d) 10-60 wt % clay; and
e) 1-12 wt % phosphate.

In another embodiment, the said attrition resistant hydrocarbon cracking catalyst additive possesses Attrition Index (ASTM D5757) below 5 and ABD above 0.75 g/cm$^3$.

In a preferred embodiment, the said aluminium phosphate binder is having surface area in the range of 80-200 m$^2$/gm when dried, and zeta potential in the range of −40 mv to −60 mv.

In one of the preferred embodiment, the said aluminium phosphate binder is incorporated into the ZSM-5 additive composition to enhance attrition resistance property of additive composition and to enhance selectivity and activity of additive composition for production of light olefins. In one another embodiment, the said aluminium phosphate binder is prepared by reacting aluminium compound with acidic phosphate compound and at least one basic phosphate compound.

In further embodiment, the said aluminium compound is selected from the group comprising of aluminium nitrate, aluminium chloride, aluminium sulfate and aluminium acetate.

In yet another embodiment, the said acidic phosphate compound is phosphoric acid and said basic phosphate compound is selected from di-ammonium hydrogen phosphate, mono-ammonium di-hydrogen phosphate or mixture thereof.

In other embodiment, the present invention relates to a process for preparation of an aluminium phosphate binder having surface area in the range of 80-200 m$^2$/gm in dry form, and zeta potential in the range of −40 mv to −60 mv, wherein said process comprises of reacting aluminium compound with acidic phosphate compound and at least one basic phosphate compound.

In one another embodiment, the present invention relates to a process for preparation of an attrition resistant cracking catalyst additive composition comprising:
a) preparing an aluminium phosphate binder solution by adding aqueous solution of a basic phosphate compound to an aluminium phosphate solution, wherein said aluminium phosphate solution is prepared by reacting an aluminium compound with acidic phosphate compound in water under heating;
b) preparing phosphated zeolite slurry by adding di-ammonium hydrogen phosphate to zeolite;
c) preparing clay-silica-alumina phosphate slurry by adding kaolin clay slurry and ammonium polysilicate to aluminium phosphate binder solution of step (a);
d) preparing additive precursor slurry by adding the phosphated zeolite slurry of step (b) to the clay-silica-alumina phosphate slurry of step (c); and
e) spray-drying followed by calcinations of the additive precursor slurry of step (d) to obtain the final attrition resistance additive product ready for use to crack the hydrocarbon molecules to produce light olefins.

In one another embodiment, the present invention relates to process for preparation of an aluminium phosphate binder wherein said process involves reacting aluminium compound with acidic phosphate compound and at least one basic phosphate compound wherein said aluminium compound is selected from the group comprising of aluminium nitrate, aluminium chloride, aluminium sulfate and aluminium acetate.

In most preferred embodiment, the aluminium compound is aluminium nitrate.

In another preferred embodiment, the acidic phosphate compound used for preparation of aluminium phosphate binder is phosphoric acid.

In yet another preferred embodiment, the basic phosphate compound used for preparation of aluminium phosphate binder is selected from di-ammonium hydrogen phosphate, mono-ammonium di-hydrogen phosphate or mixture thereof.

In other embodiment, the present invention relates to an aluminium phosphate binder having surface area in the range of 80-200 m$^2$/gm in dry form, and zeta potential in the range of −40 mv to −60 mv, wherein said binder is prepared by a process comprising of reacting an aluminium compound with acidic phosphate compound and at least one basic phosphate compound.

In furthermore embodiment, the present invention provides a process of preparation of additive composition wherein said zeolite is selected from mordenite, ZSM-5, beta, ZSM-11 with silica alumina ratio ranging from 8 to 200.

In a preferred embodiment, the aluminium phosphate is prepared by reacting aluminium and phosphate sourced from both acidic and basic component. The aluminium phosphate binder of the present invention allows loading of zeolite as high as 70 wt % at the same time maintaining attrition index.

In further embodiment, the aluminium phosphate binder prepared by reacting aluminium compound with acidic phosphate compound and at least one basic phosphate compound is characterized by surface area of 80-200 m$^2$/gm in dry form, and zeta potential in the range of −40 mv to −60 mv and is used to enhance the activity and selectivity of the additive composition by incorporating with the phosphate treated ZSM-5 zeolite, colloidal silica and clay.

In one of the preferred embodiment, the aluminium phosphate binder ensures smoother catalyst surface free of pits and cracks and the application of said binder allows uninterrupted production of catalyst due to reduction in viscosity of catalyst precursor slurry which results increase in catalyst production throughput.

In another preferred embodiment, the said catalyst can be used from 1-40 wt % concentration in the main FCC catalyst and exhibits selectivity towards LPG.

TABLE 1

| Feed properties | | | |
|---|---|---|---|
| Sr No | Attributes | Unit | Value |
| 1 | Density @ 15° C. | g/cc | 0.887 |
| 2 | Kinematic Viscosity @ 100° C. | Cst | 7.4 |
| 3 | Distillation, D-1160 | | |
| 4 | IBP | ° C. | 162 |
| 5 | 5% | ° C. | 267 |
| 8 | 30% | ° C. | 370 |
| 9 | 50% | ° C. | 409 |

TABLE 1-continued

Feed properties

| Sr No | Attributes | Unit | Value |
|---|---|---|---|
| 10 | 70% | ° C. | 457 |
| 11 | Sulphur | wt % | 1.72 |
| 1 | Total N2 | ppm | 860 |
| 13 | CCR | wt % | 3.3 |
| 14 | V | ppm | 23 |
| 15 | Ni | ppm | 9 |
| 16 | Na | ppm | 1.8 |
| 17 | Fe | ppm | 2.4 |

Table 1 depicts the typical feed properties of a representative feed used in the refinery for FCC. The representative feed is used to evaluate the different additives under similar conditions.

EXAMPLES

Example-1

Additive Prepared as Per Example-7 of U.S. Pat. No. 7,517,827 and Increased Zeolite Content from 25 wt % to 40 wt %

98.63 gm of Pural SB grade alumina (having loss on ignition of 23.96 wt %) was made into a slurry with 425 gm of Demineralised (DM) water. The slurry was peptized with 21.52 gm of formic acid (85% concentration). 682.72 gm of ZSM-5 zeolite (loss on ignition 12.12 wt %) having silica to alumina molar ratio of 30 was made into a slurry with 700 gm of 10% ammonia solution followed by addition of 27.7 gm phosphoric acid (85%) to produce a zeolite slurry having pH of 7.8. 758.02 gm of kaolin clay (having loss on ignition 14.91 wt %) was made into a slurry with 800 gm DM water and kept under vigorous stirring while 191.53 gm of orthophosphoric acid (concentration 85 wt %) was added. Earlier prepared alumina gel and zeolite slurry were added to the clay-phosphate slurry one after another under vigorous stirring. Final slurry having a pH of about 2.9 was spray dried in a counter current spray drier having two fluid nozzles. Spray dried product was calcined at 500° C.

Calcined additive showed ABD of 0.77 g/cc and ASTM D5757 attrition index of 30. The catalyst is then de-activated and evaluated in Advanced Cracking Evaluation R+ Micro Activity Test unit at 5 wt % concentration level along with base catalyst and feed (Table-1). Physical properties along with performance results are shown in the Table 3 & 4.

Example-2

Preparation of Additive using Aluminium Phosphate as per Example-2 of U.S. Pat. No. 5,286,369

83.41 gm of di-ammonium hydrogen phosphate (DAHP) was dissolved in 500 gm of DM water and 454.55 gm of ZSM-5 zeolite (loss on ignition 12 wt %) having silica to alumina molar ratio of 30 was added under stirring to form phosphated zeolite slurry having pH of 7.2. 399.62 gm of kaolin clay (having loss on ignition 14.92 wt %) was made into a slurry with 400 gm DM water and kept under vigorous stirring while 664.45 gm of aluminium phosphate prepared as per the method mentioned in the Example-2 of U.S. Pat. No. 5,286,369 was added followed by addition of 333.33 gm of ammonium poly-silicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH<1 was spray dried in a counter current spray drier having two fluid nozzles. Spray dried product was calcined at 500° C.

Calcined catalyst showed ABD of 0.78 g/cc and ASTM D5757 attrition index of 1.2. The catalyst is then de-activated and evaluated in Advanced Cracking Evaluation R+ Micro Activity Test unit at 5 wt % concentration level along with base catalyst and feed (Table-1). Physical properties along with performance results are shown in the Table 3 & 4. Although the additive possess attrition index of 1.2, however it shows inferior activity.

Example-3

Preparation of Aluminium Phosphate of Current Invention 61.25 gm of aluminium nitrate $(Al(NO_3)_3, 9\ H_2O)$ was dissolved in 17.98 gm of DM water and heated the solution at 80° C. after addition of 5.93 gm of phosphoric acid to form solution A. The temperature of the solution A was bringing down to room temperature before preparation of final aluminium phosphate solution. 6.79 gm of di-ammonium hydrogen phosphate was dissolved in 8.05 gm DM water to form a Solution B. Solution B was added gradually to the solution A under stirring to form final aluminium phosphate solution ready for use in the preparation of ZSM-5 additive. Thus the prepared aluminium phosphate solution has zeta potential −50 mv. Further the prepared aluminium phosphate has surface area more than 80 $m^2/gm$ when oven dried at 120° C. followed by calcinations at 500° C. for 1 hr.

TABLE 2

Binder AlPO$_4$ Preparation

| Binder preparation | Example-1&2 of U.S. Pat. No. 5,286,369 Wt % | Current invention Wt % |
|---|---|---|
| Composition of solution A | | |
| Al(NO$_3$)$_3$•9H$_2$O | 43.17-45.92 | 61.25 |
| DM Water | 36.29-45.51 | 17.98 |
| H$_3$PO$_4$ | 11.31-17.79 | 5.93 |
| Composition of solution B | | |
| DM Water | 0 | 8.05 |
| (NH$_4$)$_2$HPO$_4$ | 0 | 6.79 |
| Total | 100 | 100 |
| Surface Area, m$^2$/gm | <5 | >80 |

Example-4

Preparation of Additive using Aluminium Phosphate Prepared as per Example-3 of Current Invention with 40 wt % Zeolite Concentration 83.41 gm of di-ammonium hydrogen phosphate (DAHP) was dissolved in 500 gm of DM water and 454.55 gm of ZSM-5 zeolite (loss on ignition 12 wt %) having silica to alumina molar ratio of 30 was added under stirring to form phosphated zeolite slurry having pH of 7.2. 399.62 gm of kaolin clay (having loss on ignition 14.92 wt %) was made into a slurry with 400 gm DM water and kept under vigorous stirring while 664.45 gm of aluminium phosphate as prepared under Example-3 was added followed by addition of 333.33 gm of ammonium polysilicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH of about 1.3 was spray dried in a counter current spray drier having two fluid nozzles. Spray dried product was calcined at 500° C.

Calcined additive has ABD of 0.79 g/cc and ASTM D5757 attrition index of 2.92. The additive is then de-activated and evaluated in Advanced Cracking Evaluation R+ Micro Activity Test unit at 5 wt % concentration level along with base catalyst and feed (Table-1). Physical properties along with performance results are shown in the Table 3 & 4. The additive shows high LPG selectivity Example-5

Preparation of Additive using Aluminium Phosphate Prepared as per Example-3 of Current Invention with 50% Zeolite Concentration 83.41 gm of DAHP was dissolved in 625 gm of DM water and 568.18 gm of ZSM-5 zeolite (loss on ignition 12 wt %) having silica to alumina molar ratio of 30 was added under stirring to form phosphated zeolite slurry having pH of 7.5. 282.09 gm of kaolin clay (having loss on ignition 14.92 wt %) was made into a slurry with 300 gm DM water and kept under vigorous stirring while 664.45 gm of aluminium phosphate as prepared under Example-3 was added followed by addition of 333.33 gm of ammonium poly-silicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH of about 1.4 was spray dried in a counter current spray drier having two fluid nozzles. Spray dried product was calcined at 500° C.

Calcined additive has ABD of 0.78 g/cc and ASTM D5757 attrition index of 3.5. The additive is then de-activated and evaluated in Advanced Cracking Evaluation R+ Micro Activity Test unit at 5 wt % concentration level along with the base catalyst and feed (Table-1). Physical properties along with performance results are shown in the Table 3 & 4. The additive shows high LPG selectivity.

Example-6

Preparation of Additive using 14 wt % Aluminium Phosphates Prepared as per Example-3 of Current Invention and with 40 wt % Zeolite Concentration 83.41 gm of DAHP was dissolved in 500 gm of DM water and 454.55 gm of ZSM-5 zeolite (loss on ignition 12 wt %) having silica to alumina molar ratio of 30 was added under stirring to form phosphated zeolite slurry having pH of 7.2. 352.61 gm of kaolin clay (having loss on ignition 14.92 wt %) was made into a slurry with 370 gm DM water and kept under vigorous stirring while 930.23 gm of aluminium phosphate as prepared under Example-3 was added followed by addition of 333.33 gm of ammonium poly-silicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH of about 1.2 was spray dried in a counter current spray drier having two fluid nozzles. Spray dried product was calcined at 500° C.

Calcined additive has ABD of 0.79 g/cc and ASTM D5757 attrition index of 2.5. The additive is then de-activated and evaluated in Advanced Cracking Evaluation R+ Micro Activity Test unit at 5 wt % concentration level along with the base catalyst and feed (Table-1). Physical properties along with performance results are shown in the Table 3 & 4. The additive shows inferior LPG selectivity.

TABLE 3

Additive composition and their physical properties

| | Example-1 Prepared as per U.S. Pat. No. 7,517,827 | Example-2 | Example-4 | Example-5 | Example-6 |
|---|---|---|---|---|---|
| Binder AlPO4, wt % | 0 | 10 (Prepared as per U.S. Pat. No. 5,286,369) | 10 (Prepared as per Example 3) | 10 (Prepared as per Example 3) | 14 (Prepared as per Example 3) |
| PSB Alumina | 5 | 0 | 0 | 0 | 0 |
| Zeolite, wt % | 40 | 40 | 40 | 50 | 40 |
| Clay, wt % | 43 | 34 | 34 | 24 | 30 |
| $H_3PO_4$ (as $PO_4$), wt % | 12 | 0 | 0 | 0 | 0 |
| $(NH_4)_2HPO_4$ as $PO_4$. Wt % | 0 | 6 | 6 | 6 | 6 |
| $SiO_2$ | 0 | 10 | 10 | 10 | 10 |
| ABD, gm/cc | 0.77 | 0.78 | 0.79 | 0.78 | 0.79 |
| Attrition Index, ASTM D5757 | 12 | 1.20 | 2.92 | 3.5 | 2.5 |

TABLE 4

Performance results of additive prepared as per examples 1 to 6

| | Base Catalyst + 5 wt % Additive of Example-1 | Base Catalyst + 5 wt % Additive of Example-2 | Base Catalyst + 5 wt % Additive of Example-4 | Base Catalyst + 5 wt % Additive of Example-5 | Base Catalyst + 5 wt % Additive of Example-6 |
|---|---|---|---|---|---|
| Cat/oil | 7.52 | 7.52 | 7.52 | 7.52 | 7.52 |
| 220° C. Conversion, wt % | 81.93 | 80.77 | 82.20 | 82.50 | 81.11 |

TABLE 4-continued

Performance results of additive prepared as per examples 1 to 6

|  | Base Catalyst + 5 wt % Additive of Example-1 | Base Catalyst + 5 wt % Additive of Example-2 | Base Catalyst + 5 wt % Additive of Example-4 | Base Catalyst + 5 wt % Additive of Example-5 | Base Catalyst + 5 wt % Additive of Example-6 |
|---|---|---|---|---|---|
| Coke | 8.03 | 7.99 | 7.95 | 7.83 | 8.36 |
| DG | 2.30 | 2.33 | 2.36 | 2.41 | 2.12 |
| LPG | 27.68 | 25.74 | 27.80 | 28.27 | 26.15 |
| Gasoline (C5-150) | 33.24 | 34.41 | 34.32 | 34.16 | 34.63 |
| HN (150-220) | 10.68 | 10.23 | 9.77 | 9.83 | 9.85 |
| LCO (220-370) | 13.77 | 14.98 | 13.60 | 13.48 | 13.98 |
| Bottom (370+) | 4.30 | 4.32 | 4.20 | 4.02 | 4.91 |

The examples 3, 4 & 5 were prepared based on present invention. The example-3 teaches the preparation of novel aluminium phosphate binder. Examples 4 & 5 were the final additive product prepared based on example 3. The performance of examples 4 & 5 shows better LPG selectivity.

We claim:

1. An attrition resistant hydrocarbon cracking catalyst additive composition comprising an aluminium phosphate binder, wherein said aluminium phosphate binder has zeta potential in the range of −40 mv to −60 mv in liquid form and a surface area in the range of 80-200 m$^2$/gm in dry form; wherein said additive composition comprises:
   a) 10-70 wt % ZSM-5 zeolite;
   b) 5-12 wt % of the aluminium phosphate binder;
   c) 5-20 wt % colloidal silica;
   d) 10-60 wt % clay; and
   e) 1-12 wt % phosphate.

2. The composition as claimed in claim 1, wherein said additive has Attrition Index (ASTM D5757) below 5 and ABD above 0.75 g/cm$^3$.

3. The composition as claimed in claim 1, wherein said aluminium phosphate binder is prepared by reacting an aluminium compound with an acidic phosphate compound and at least one basic phosphate compound.

4. The composition as claimed in claim 3, wherein the aluminium compound is selected from the group comprising of aluminium nitrate, aluminium chloride, aluminium sulfate and aluminium acetate.

5. The composition as claimed in claim 3, wherein the acidic phosphate compound is phosphoric acid and said basic phosphate compound is selected from di-ammonium hydrogen phosphate, mono-ammonium di-hydrogen phosphate or mixture thereof.

* * * * *